US009026756B2

(12) United States Patent
Taki (10) Patent No.: US 9,026,756 B2
(45) Date of Patent: May 5, 2015

(54) MEMORY DEVICE WITH COPYRIGHT PROTECTION

(75) Inventor: Daisuke Taki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 282 days.

(21) Appl. No.: 13/424,969

(22) Filed: Mar. 20, 2012

(65) Prior Publication Data

US 2013/0007393 A1 Jan. 3, 2013

(30) Foreign Application Priority Data

Jun. 28, 2011 (JP) .................................. 2011-143429

(51) Int. Cl.
*G06F 12/00* (2006.01)
*G06F 21/79* (2013.01)
*G11B 20/00* (2006.01)

(52) U.S. Cl.
CPC ............ *G06F 21/79* (2013.01); *G11B 20/0021* (2013.01); *G11B 20/00362* (2013.01); *G11B 20/00731* (2013.01); *G11B 2220/60* (2013.01)

(58) Field of Classification Search
None
See application file for complete search history.

(56) References Cited

U.S. PATENT DOCUMENTS

| 7,100,835 | B2 * | 9/2006 | Selker ........................... 235/492 |
| 2002/0174337 | A1 | 11/2002 | Aihara | |
| 2010/0161972 | A1 * | 6/2010 | Staring et al. ................. 713/158 |

FOREIGN PATENT DOCUMENTS

| CN | 101213785 A | 7/2008 |
| JP | 2002-329180 A | 11/2002 |
| JP | 2003-228536 A | 8/2003 |
| JP | 2008-545317 A | 12/2008 |
| JP | 2010-28485 | 2/2010 |
| TW | 200623070 | 7/2006 |
| WO | WO 2006/008972 A1 | 1/2006 |

OTHER PUBLICATIONS

Chinese Office Action dated Aug. 25, 2014, issued in Chinese Patent Application No. 201210222665.8 (with English translation).
Japanese Office Action issued Apr. 22, 2014 in Patent Application No. 2011-143429 with English Translation.

* cited by examiner

*Primary Examiner* — Shawn X Gu
(74) *Attorney, Agent, or Firm* — Oblon, McClelland, Maier & Neustadt, L.L.P.

(57) ABSTRACT

According to one embodiment, a memory device includes a semiconductor memory, a memory controller which controls the semiconductor memory according to a request from outside the device, a radio section for wireless communication, and a controller. The controller manages storing data in the device according to a procedure for protecting copyright, obtains the latest version of a parameter for protecting copyright which can be updated from outside the device via the radio section, includes a comparator which compares the parameter stored in the device with the latest version of the parameter, and includes an update manager which updates the stored parameter to the latest version of the parameter when they are different.

19 Claims, 10 Drawing Sheets

MEMORY DEVICE WITH COPYRIGHT PROTECTION

CROSS-REFERENCE TO RELATED APPLICATIONS

This application is based upon and claims the benefit of priority from prior Japanese Patent Application No. 2011-143429, filed Jun. 28, 2011, the entire contents of which are incorporated herein by reference.

FIELD

Embodiments described herein relate generally to a memory device with a communication capability.

BACKGROUND

There is a memory device as a media for storing data. Some memory devices contain a nonvolatile semiconductor memory and a controller for controlling it. An example of such a memory device may be a memory card such as an SD™ card. Such a memory card and a host device record (or, write) and play (or, read) content data in compliance with schemes for protecting the copyright of the data. Several functions are defined for such schemes; however, some of them may not be fully in use due to their natures. Specifically, practicing some functions require specific procedure and operation by a user; however he or she may be hardly willing to do such procedure and operation because protection of content data provides merits to content holders but not to the user.

DETAILED DESCRIPTION

In general, according to one embodiment, a memory device includes a semiconductor memory, a memory controller which controls the semiconductor memory according to a request from outside the device, a radio section for wireless communication; and a controller. The controller manages storing data in the device according to a procedure for protecting copyright, obtains the latest version of a parameter for protecting copyright which can be updated from outside the device via the radio section, includes a comparator which compares the parameter stored in the device with the latest version of the parameter, and includes an update manager which updates the stored parameter to the latest version of the parameter when they are different.

Schemes for protecting the copyright for a memory system including a memory device and a host device may include media bind, revocation, and move. The media bind involves encrypting content data (which may simply be referred to as data hereinafter) with a content key generated by a content-data-recording host device (recorder) and writing the encrypted content data in the memory device. The content key is also encrypted with a key generated using identification (ID) unique to the media and a device key unique to the host device. The encrypted content key is written in the memory device. The data which has been written with the media bind scheme and copied to another memory device cannot be decrypted and therefore cannot be played, because the content key for decoding the data cannot be obtained from the memory device storing the copied data.

The revocation refers to a scheme for invalidating a specific device key. Once a device key confidential to outside the host device is exposed, the copyright protection mechanism can be disabled using the exposed device key. A master key is necessary for the host device to record or play data in the memory device in accordance with the procedure for protecting copyright. The device key is used for processing inside the host device such as data decoding, and confidential to the outside. However, the device key may be exposed outside by illegal acts. A malevolent third party which has obtained the exposed device key may generate the master key and in turn the content key, and a plaintext using the content key. To combat such possibilities, the revocation can invalidate only the exposed device key and prohibit recording and playing data by the host device which has the exposed device key. A memory device which supports the revocation stores data referred to as a media key block (MKB). A host device which supports the revocation generates the master key from the MKB received from the memory device and its own device key. The host device should succeed in reproduction of the master key if the device key is valid, or not invalidated. In contrast, if the MKB is configured to invalidate the device key of a particular host device, such a host device cannot generate the master key to continue processing for recording or playing data. Thus, the revocation is provided.

As described, the revocation is achieved by invalidating exposed device keys. Therefore, the MKB needs to be timely updated to the latest one configured to invalidate the exposed device keys. In other words, it is important to keep the MKB fresh. Since a memory device manufactured after update of the MKB stores the latest MKB, the revocation functions as designed. In contrast, updating the MKB in a distributed memory device may need a user to update the memory device in a public special terminal. However, the user may be hardly willing to update the MKB because it provides them with no merit.

Embodiments configured according to such findings will now be described with reference to drawings. Components with substantially the same functions and configurations will be referred to with the same reference numbers and repetitive descriptions will be given only when required. Embodiments described in the following illustrate devices and methods for realizing the technical idea of the embodiments, and the technical idea of the embodiments does not limit details to ones introduced below. The technical idea of the embodiments may be variously changed in accordance with the scope of the claims.

Each functional block may be implemented as hardware, computer software, or combination of the both. In order to clearly illustrate this interchangeability of hardware and software, descriptions will be made in terms of their functionality in general. Whether such functionality is implemented as hardware or software depends upon the particular application and design constraints imposed on the overall system. Those of skilled in the art may implement the functionality in varying ways for each particular application, but any implementation approach is included in the scope of the embodiments.

Furthermore, it is not essential that the functional blocks are distinguished from one another as described below in specific examples.

For example, some of the functions may be performed by functional blocks different from those illustrated below. Moreover, the illustrated functional block may be divided into functional sub-blocks. The embodiment is not limited by the specification of the particular functional blocks.

The following description will be given of an SD™ card used as an example of a memory device. However, neither of the embodiments is limited to the specific examples. Any embodiment should cover a memory device which is a media for data recording, includes a nonvolatile memory and a controller for controlling it, and a wireless communication capability.

First Embodiment

Figure 1:
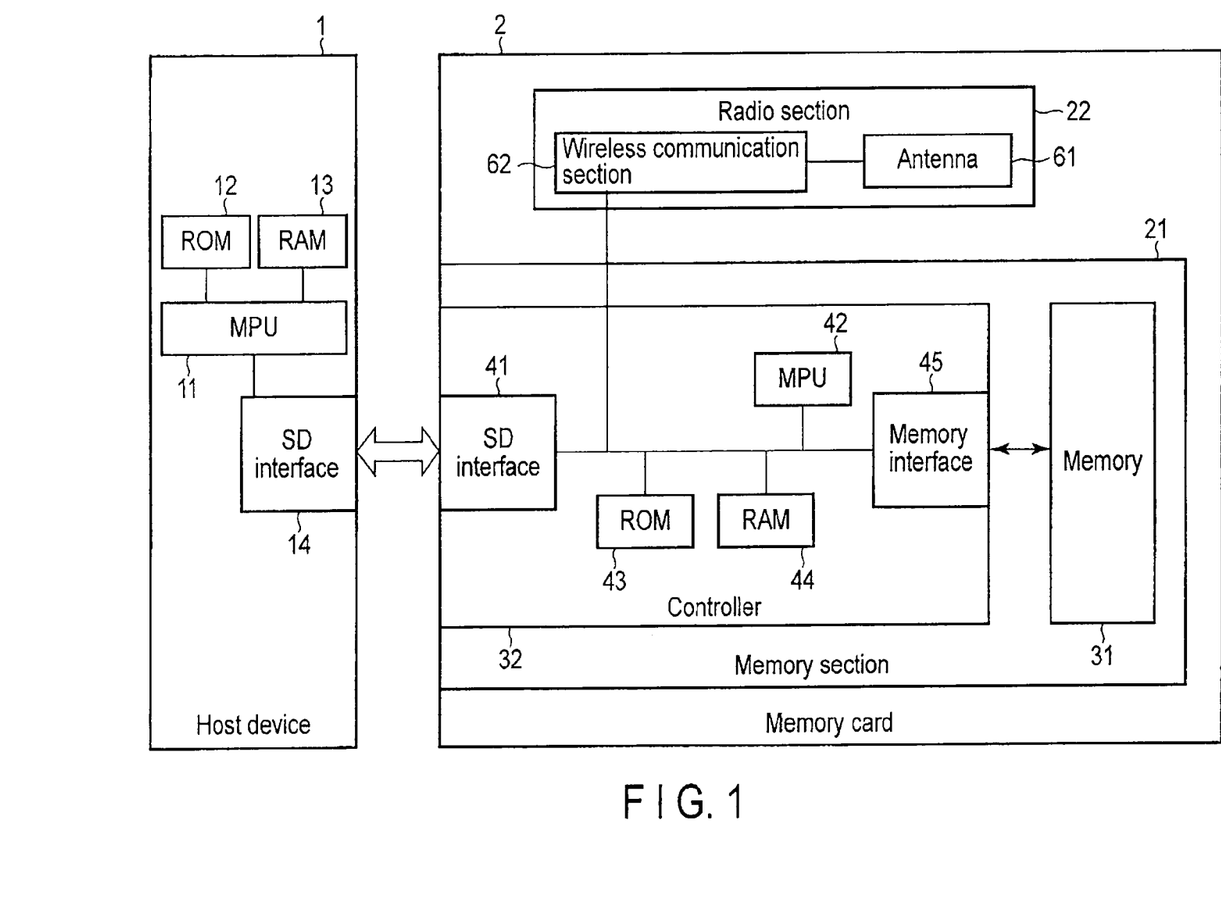
FIG. 1 schematically illustrates a configuration of a memory device according to a first embodiment.

FIG. 1 schematically illustrates a configuration of a memory device according to the first embodiment. FIG. 1 also illustrates a host device which accesses the memory device. As shown in FIG. 1, the host device 1, which may be simply referred to as a host hereinafter, includes a micro processing unit (MPU) 11, a read only memory (ROM) 12, a random access memory (RAM) 13, and an interface 14. The ROM 12 and/or RAM 13 store a control program (or, commands) for implementing operation by the host 1 such as software including an operating system and various kinds of applications and a file system. The control program is loaded in the RAM 13 when the host 1 receives power supply, and executed by the MPU 11 to control the whole or part of the operation of the host 1. The control program writes and read data in and from the memory card 2 and plays the read data according to instructions from a user, for example. The interface 14 includes hardware and software to allow the host 1 to interface with the memory card 2 and hardware configuration such as an array of the defined number of pins, and uses commands and procedures which comply with various protocols with which the host 1 and the memory card 2 comply to be responsible for communications between the host 1 and memory card 2. The software part of the interface 14 may be performed by a control program when executed by the MPU 11. For an example of the SD™ card, the interface 14 corresponds to the SD interface.

The memory card 2 includes a memory section 21 and a radio section 22. The memory section 21 includes a memory 31 and a controller 32 for controlling it. Upon start of power supply from the host 1, the memory card 2 performs initialization and then performs processing according to the host 1.

The memory 31 non-volatilely stores data, writes and reads data in a unit called a page, and may be a NAND flash memory. One page includes memory space by a set of serially-connected memory cells and has a unique physical address assigned. The memory 31 erases data in a unit called a block which includes or consists of more than one page with serial physical addresses. Each memory cell includes a metal oxide semiconductor field effect transistor (MOSFET) of a so-called stacked gate structure. Each cell transistor has a variable threshold voltage according to the number of the electrons stored in its floating gate electrode, and stores variable information according to the threshold voltage. The memory 31 may be configured to allow their cell transistors to take states with different threshold voltages, i.e., to allow each of them to store multiple-level (or, multiple-bit) data.

The controller 32 is for controlling the memory 31. Such control includes management of state of the data stored in the memory 31 and execution of requests from the host 1 which cannot be directly executed by the memory 31 in a translated form suitable for the memory 31. The controller 32 includes components such as an interface 41, an MPU 42, a ROM 43, a RAM 44, and an interface 45.

The ROM 43 stores firmware (or, control program and/or commands) for implementing operation by the memory card 2. Upon start of power supply to the memory card 2, the firmware is loaded in the RAM 44 and executed by the MPU 42 to control the whole or part of operation of the memory card 2. The MPU 42 performs processing according to the firmware and performs processing on the memory 31 according to commands received from the host. The interface 41 includes hardware and software to allow the memory card 2 to interface with the host 1. The interface 41 includes hardware configuration such as an array of the defined number of pins like the interface 14, and uses commands and procedures which comply with various protocols with which the host 1 and the memory card 2 comply to be responsible for communications between the host 1 and the memory card 2. Specifically, the interface 41 translates requests and data to and from the control program for the controller 32 to and from ones in a form suitable for the host 1 and the memory card 2. For an example of the SD™ card, the interface 41 corresponds to the SD interface.

The interface 45 performs processing for the controller 32 to interface with the memory 31. Particularly, the interface 45 executes requests from the MPU 42 (or, the control program) to the memory 31 in a translated form recognizable by the memory 31.

Figure 2:
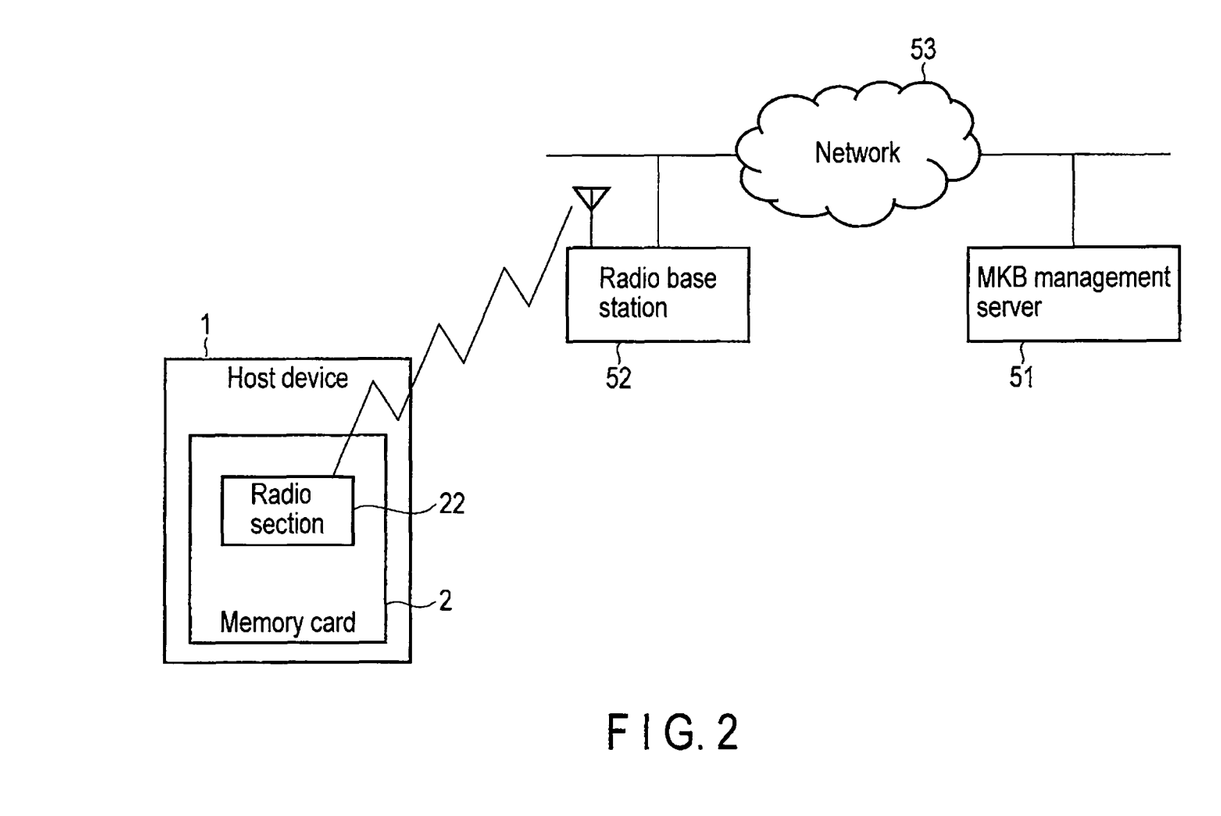
FIG. 2 schematically illustrates communications between the memory device and a management server according to the first embodiment.

The radio section 22 is configured to allow the memory card 2 in the host 1 to communicate with an MKB management server 51 as shown in FIG. 2. Specifically, the radio section 22 is configured to allow the memory card 2 to communicate wirelessly with a radio base station 52. The radio base stations 52 is communicatively coupled to the MKB management server 51 via a network 53, and the memory card 2 communicates with the MKB management server 51 via the radio base stations 52 and the network 53.

The radio section 22 includes at least an antenna (or, antenna array) 61 as shown in FIG. 1. The radio section 22 also includes a wireless communication section 62. The wireless communication section 62 communicates with the memory section 21, and controls the antenna 61. Specifically, the wireless communication section 62 controls the antenna 61 to transmit a communication such as a data transmission request and an inquiry to the radio base station 52 according to request from the memory section 21. The antenna 61 receives a communication addressed to the memory card 2 from the radio base stations 52 and transfers it to the wireless communication section 62. The wireless communication section 62 transmits the received communication to the memory section 21. The wireless communication section 62 is implemented by hardware, software, or combination thereof in the radio section 22, for example. The wireless communication section 62 may be implemented by the MPU 42 executing a program stored in the ROM 43 and loaded in the RAM 44.

Figure 3:
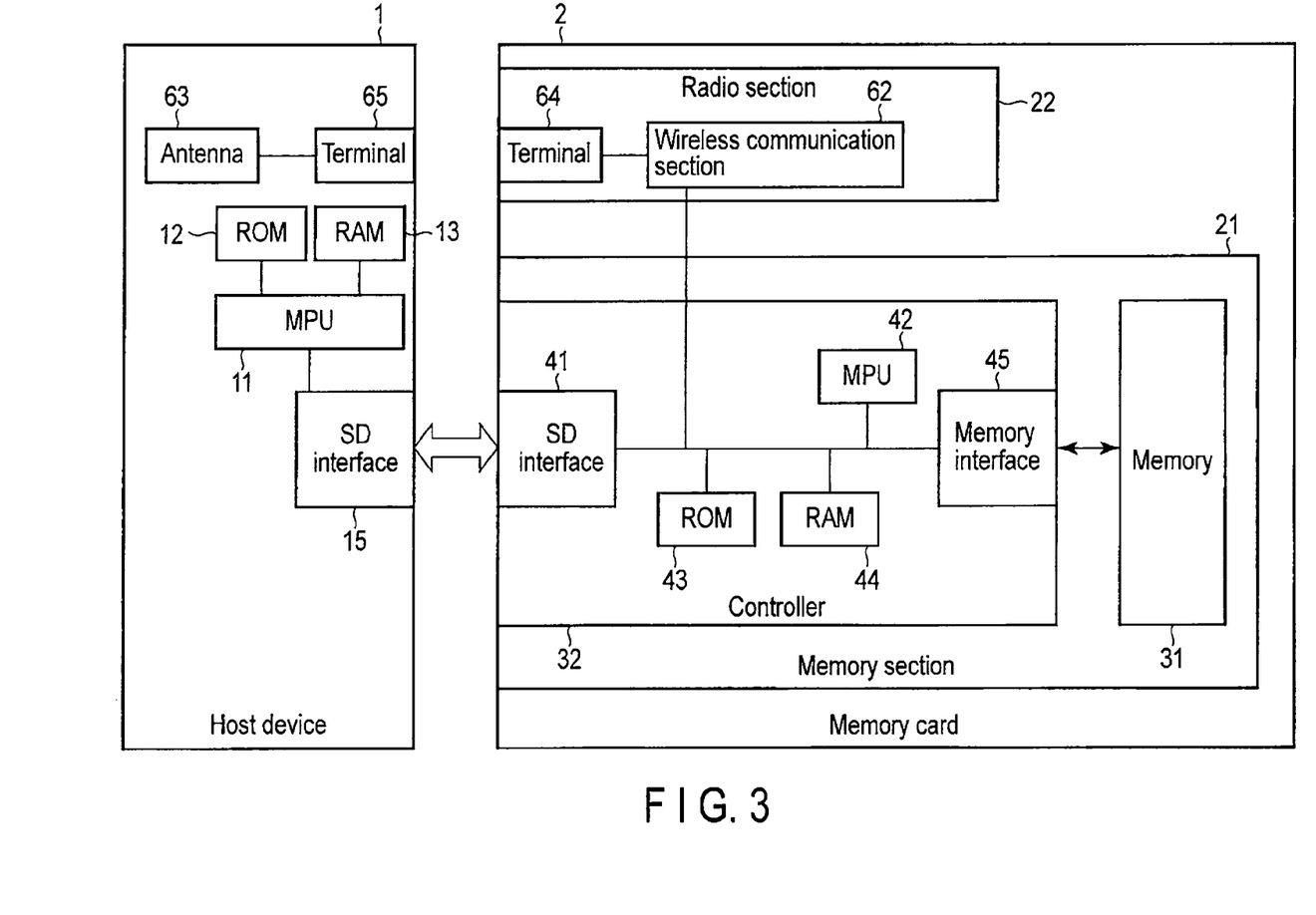
FIG. 3 schematically illustrates a configuration of another example of a memory device according to the first embodiment.

The antenna 61 may not be provided in the memory card 2. Instead, an antenna may be provided in the host 1, and the memory card 2 is configured to be communicatively coupled to the antenna when inserted into the host 1. FIG. 3 schematically illustrates another example of a memory system. The radio section 22 in the memory card 2 does not include the antenna 61 as shown in FIG. 3. On the other hand, the host 1 includes an antenna 63. The wireless communication section 62 is coupled to a terminal(s) 64, and the host 1 also has a terminal(s) 65. The terminal 65 is coupled to the antenna 63, and is configured to be electrically coupled to the terminal 64 when the memory card 2 is inserted into the host 1. The wireless communication section 62 uses the antenna 63 in the host 1 to communicate wirelessly with the radio base stations 52. The terminals 64 and 65 may be included in the interfaces 14 and 41, or separately from them.

Figure 4:
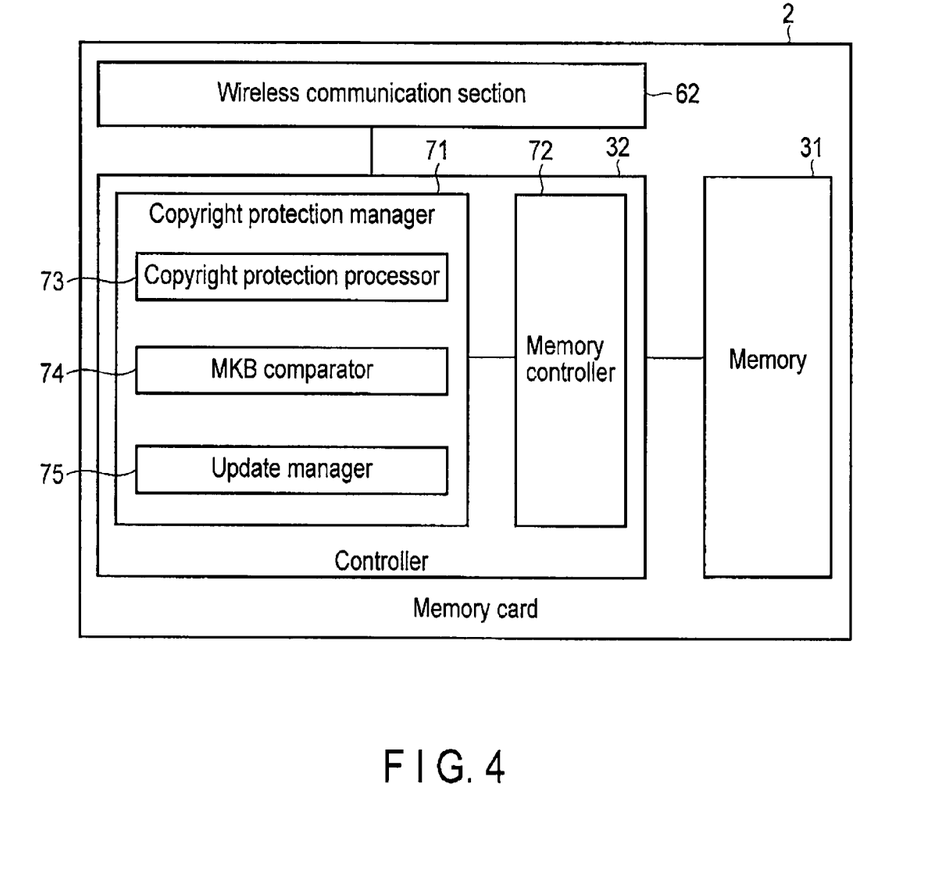
FIG. 4 illustrates functional blocks of the memory device according to the first embodiment.

Referring to FIG. 4, data copyright protection according to the memory card 2 will now be described. FIG. 4 illustrates functional blocks of the memory card 2. The functional blocks are implemented in the controller 32. They are implemented by the control program in the ROM 43 and/or RAM 44 when executed by the MPU 42 as described above. Alternatively, they may be implemented by dedicated hardware, or the combination of hardware and software. The controller 32 includes a copyright protection manager 71 and a memory controller 72 as its functional blocks. The memory controller 72 performs any processing required to execute a request from the host 1 such as one performed by a memory controller in a conventional memory card. Specifically, such processing includes one regarding various control programs such as the above-mentioned firmware and interface between the host 1 and the memory 31.

The copyright protection manager 71 executes and manages various kinds of processing for protecting content data according to the copyright protection (content protection for recordable media, or CPRM) standard(s) supported by the memory card 2. Such processing includes at least the revocation. In addition to it, the following description discusses an example which also supports the media bind. An additional scheme may be supported optionally. The copyright protection manager 71 includes a copyright protection processor 73, an MKB comparator 74, and an update manager 75, which are communicatively coupled to each other.

The copyright protection processor 73 executes various kinds of processing for protecting content data according to the copyright protection standard supported by the memory card 2. An example of such processing will be described in detail later. The MKB comparator 72 is responsible for processing for comparing the MKB stored in the memory card 2 with the MKB stored in the MKB management server 51. The update manager 75 is responsible for processing for updating the MKB in the memory card 2 when necessary.

Figure 5:
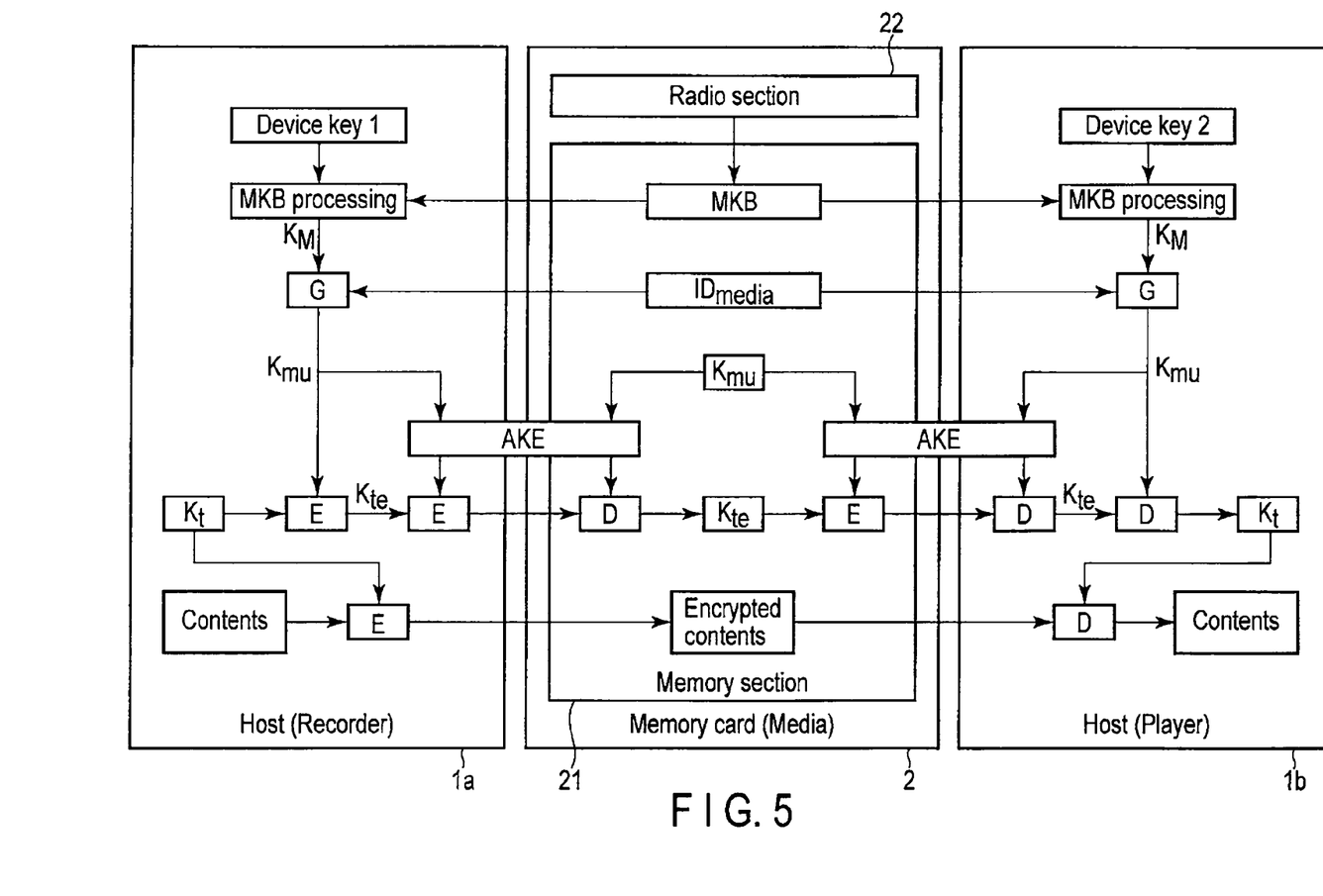
FIG. 5 illustrates a flowchart and processing for key management for protecting the copyright of content according to the first embodiment.

Referring to FIG. 5, recording and playing data according to a copyright protection function will now be described. FIG. 5 illustrates a flowchart and processing for key management for protecting the copyright of content. It illustrates a data recording host (recorder) 1a and a data playing host (player) 1b. The processing in the recorder 1a and player 1b is executed using functional blocks regarding the copyright protection in the hosts 1a and 1b. On the other hand, processing for communication between the recorder 1a and player 1b and the memory card 2 is executed by the functional blocks regarding communication. Such functional blocks are implemented by the MPU 42, ROM 43, and RAM 44 in the host 1. The processing in the memory card 2 is performed by the memory section 22. Specifically, processing for the copyright protection is performed using the copyright protection manager 71 (in particular, the copyright protection processor 73), and writing or reading the data to and from the memory 21 and the communication with the host 1 are performed using the memory controller 72.

Upon start of recording data to the memory card 2, the recorder 1a requests the memory card 2 to transmit the MKB. The MKB is data (for example, parameters) required by the host 1 to generate the master key, which is necessary for recording and playing data according to the copyright protection standard supported by the memory system. The recorder 1a attempts to generate the master key using its unique device key stored in it and the MKB. The MKB can be configured to allow the master key to be generated only when combined with specific device keys. The host 1 with the device key other than invalidated device keys can use the MKB to generate the master key. The MKB is stored in the memory card 2, in particular in an area inaccessible by the user. The MKB is guaranteed to be the latest one via techniques described below. A request to transmit the MKB is received by the memory controller 72, which in turn reads the MKB out of the memory 31 and transmits it to the recorder 1a. The MKB may also be stored in any area in the memory card 2 as well as in the memory 31.

The recorder 1a uses the obtained MKB and the device key (the device key 1) to perform MKB processing. If the recorder 1a has a valid device key, it obtains the master key $K_M$ as a result of the MKB processing. The recorder 1a henceforth uses the master key $K_M$ to record data in the memory card 2 according to the data copyright protection procedure. Specifically, the recorder 1a uses the master key, for example, to encrypt the content data and encrypt the content key used for encrypting the content data. Any copyright protection scheme using a master key may be used; however, the following description discusses an example for an SD™ card according to the ongoing context.

First, the recorder 1a requests the memory card 2 to transmit its media ID, which is stored in an area in the memory card 2 inaccessible from the user. The media ID transmission request is received by the memory controller 72, which in turn reads the media ID from the memory 31 and transmits it to the recorder 1a. The media ID may also be stored in any area in the memory card 2 as well as in the memory 31. The recorder 1a uses the obtained media ID and the master key $K_M$ to execute processing according to the copyright protection procedure. G in the figure represents a specific function which uses the media ID and the master key $K_M$. As a result of the execution of the function G, the recorder 1a obtains a media unique key $K_{mu}$.

The recorder 1a also generates a content key $K_t$ for recording data. The recorder 1a uses the content key $K_t$ to encrypt the content data. E in the figure represents encryption. The encrypted data will be written in the memory card 2. To this end, the recorder 1a requests the memory card 2 to write the encrypted data. The request and encrypted data are received by the memory controller 72. The memory controller 72 transmits instructions to execute the data writing according to the request and the to-be-written data to the memory 31 via the interface 45. The memory 31 stores the received data according to the instructions.

The recorder 1a also uses the media unique key $K_{mu}$ to encrypt the content key $K_t$. The recorder 1a requests the memory card 2 to write the encrypted content key $K_{te}$. The memory controller 72 stores the encrypted content key $K_{te}$ in an area in the memory 31 inaccessible from the user. Alternatively, the recorder 1a may further encrypt the encrypted content key $K_{te}$. To this end, the memory card 2 stores a media unique key $K_{mu}$ in an area in the memory 31 inaccessible from the user. The stored media unique key $K_{mu}$ is identical to the one generated by the host 1 from the master key $K_M$ and the media ID. The recorder 1a and the copyright protection processor 73 use the common media unique key $K_{mu}$ to execute authentication and key exchange (AKE) processing to generate a temporary key for encryption. The recorder 1a uses the generated temporary key to encrypt the encrypted content key $K_{te}$ further. The recorder 1a requests the memory card 2 to write the double-encrypted content key.

The memory controller 72 receives the double-encrypted content key. The copyright protection processor 73 uses the temporary key to decode the double-encrypted content key to obtain the encrypted content key $K_{te}$. D in the figure represents decoding. The encrypted content key $K_{te}$ is stored in an area in the memory 31 inaccessible from the user according to instructions from the memory controller 72. Thus, the data and content key $K_{te}$ encrypted according to the copyright protection schemes are written in the memory card 2.

Reading data from the memory card 2 by the host 1 is similar to writing data in fundamental regards. Therefore, matters different from data writing in particular will be roughly described. A player (host) 1b reads the MKB from the memory card 2 as in the data writing. The player 1b then uses its unique device key (device key 2) stored in it and the MKB to generate the master key $K_M$. If the device key 2 is valid, the player 1b should successfully generate the master key $K_M$. The obtained master key $K_M$ is identical to the one generated by the recorder 1b.

The player 1b reads the media ID from the memory card 2 and uses it and the device key to generate the media unique key $K_{mu}$. The generated media unique key $K_{mu}$ is identical to the one in the memory card 2. The player 1b requests the memory card 2 to transmit the encrypted content key $K_{te}$. Upon reception of the request by the memory controller 72, the player 1b and the copyright protection processor 73 execute the AKE processing using their respective media unique keys $K_{mu}$ to generate their own temporary keys. The copyright protection processor 73 uses the temporary key to encrypt the encrypted content key $K_{te}$ further. The double-encrypted content key is transmitted to the player 1b from the memory controller 72. The player 1b uses the temporary key to decode the double-decoded content key to obtain the encrypted content key $K_{te}$. The player 1b then uses the media unique key $K_{mu}$ to decode the encrypted content key $K_{te}$ to obtain the content key $K_t$. The player 1b requests the memory card 2 to transmit the encrypted data. Upon reception of the request, the memory controller 72 reads the requested data from the memory 42 and transmits it to the player 1b. The player 1b uses the content key $K_t$ to decode the received data to obtain the plaintext content data.

Figure 6:
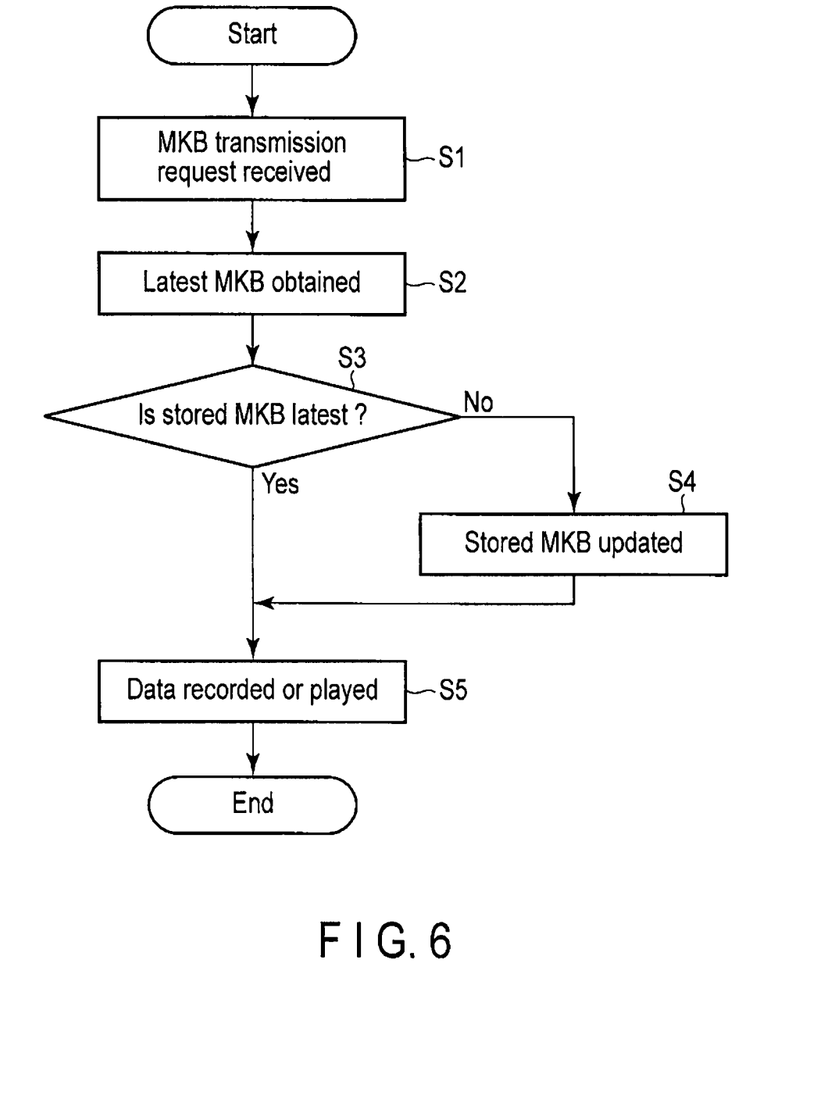
FIG. 6 illustrates a flowchart for recording and playing data according to the first embodiment.

Recording and playing data in the memory card will be further described with reference to FIG. 6. FIG. 6 illustrates a flowchart for recording and playing data according to the first embodiment. The following description assumes that the memory card 2 is online connected to the MKB management server 51. The MKB is managed by the copyright protection manager 71 (or, the copyright protection processor 73). The memory card 2 checks whether the MKB is the latest one while it is online connected to the MKB management server 51. The check may occur upon a request to write or play data in the memory card 2 from the host 2 according to the copyright protection procedure.

As shown in FIG. 6, the memory controller 72 receives an MKB transmission request (step S1). Upon reception of the request, the memory controller 72 requests the copyright protection manager 71 to check the MKB.

Step S1 is followed by steps S2 to S4 for managing the MKB. In step S2, the copyright protection processor 73 (or, the MKB comparator 74) obtains the latest MKB from the MKB management server 51 via the wireless communication section 62. To this end, the MKB comparator 74 requests the MKB management server 51 to transmit the latest MKB. The transmission request is received by the wireless communication section 62, and is then transmitted from the antenna 61 according to instructions from the wireless communication section 62. The transmission request is further transmitted to the MKB management server 51 via the radio base station 52 and the network 53. Upon reception of the transmission request, the MKB management server 51 transmits the latest MKB to the memory card 2 via the network 53 and the radio base stations 52. The latest MKB is received by the antenna 61 and then received by the MKB comparator 74 via the wireless communication section 62.

The MKB comparator 72 compares the latest MKB and the MKB in the memory card 2 (step S3). If they are identical, the MKB comparator 74 reports this result to the copyright protection processor 73, and the flow for checking the MKB is completed. If they are different, the MKB comparator 74 reports this result to the update manager 75, which in turn updates the MKB in the memory 31 to the latest one via the memory controller 72 (step S4). Thus, the processing for checking the MKB is completed. In this way, the MKB in the memory card 2 can be synchronized with the latest one in the MKB management server 51.

Steps S3 and S4 are followed by step S5, where the memory controller 72 learns the completion of the MKB check and transmits the MKB to the host device 1, and then the data is written or played using the device key and MKB according to the copyright protection procedure.

The MKB may be checked at other timing such as after the memory card 2 is online connected to the MKB management server 51 and/or periodically after that. The timing of the check is managed by the copyright protection manager 73. In the ongoing context, steps S2 to S4 are performed at specific timing according to instructions from the copyright protection manager 73.

As described above, the memory card 2 according to the first embodiment includes the radio section 22, MKB comparator 74, and update manager 75. The MKB comparator 74 compares the MKB in the memory card 2 with the latest one via wireless communication. If they are different, the update manager 75 updates the MKB in the memory card 2 to the latest one via the memory controller 72. Thus, the MKB in the memory card 2 is synchronized with the latest one, and such synchronization is autonomously executed by the memory card 2. This can maintain the MKB to be the latest one without any action by the user of the memory card 2. As a result, the revocation can be fully used via improved practice of the revocation, and robust copyright protection can be realized.

Second Embodiment

The second embodiment relates to a time limit for the MKB in the memory card 2. The memory card 2 according to the second embodiment includes the same hardware configuration as the first embodiment (FIG. 1). However, functional blocks realized by the hardware configuration differ between the first and second embodiments. The following description discusses functional blocks different from the first embodiment. In contrast, note that all description of the first embodiment is applied to matters not discussed in the description of the second embodiment.

Figure 7:
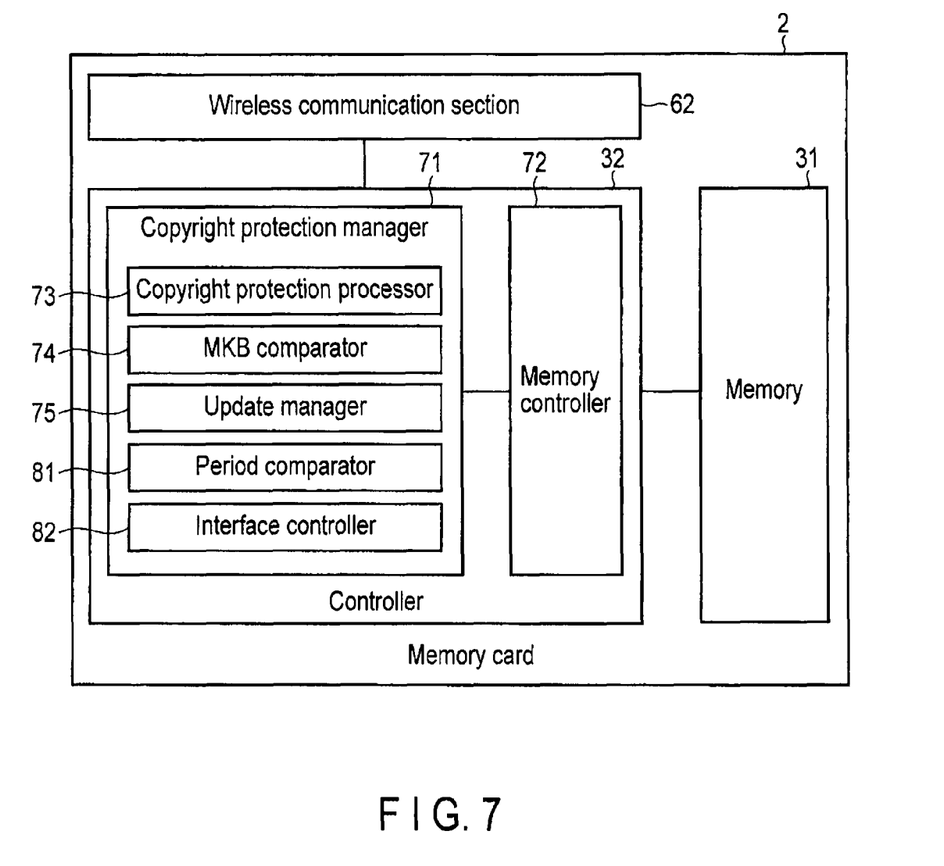
FIG. 7 illustrates functional blocks of the memory device according to a second embodiment.

FIG. 7 illustrates functional blocks of the memory card 2 according to the second embodiment. These functional blocks are also realized in the controller 32, and are implemented with the control program in the ROM 43 and/or RAM 44 when executed by the MPU 42 as described above. As shown in FIG. 7, the copyright protection manager 71 includes a period comparator 81 and an interface controller 82 as well as the functional blocks in the first embodiment.

The period comparator 81 compares the elapsed time from the last time when the MKB in the memory card 2 was updated with a reference. If the elapsed time exceeds the reference, the period comparator 81 reports such a result to the interface controller 82. The comparison may occur when the host 1 requests the memory card 2 to transmit the MKB. Upon reception of the report, the interface controller 82 prohibits the memory controller 72 from outputting the MKB.

Figure 8:
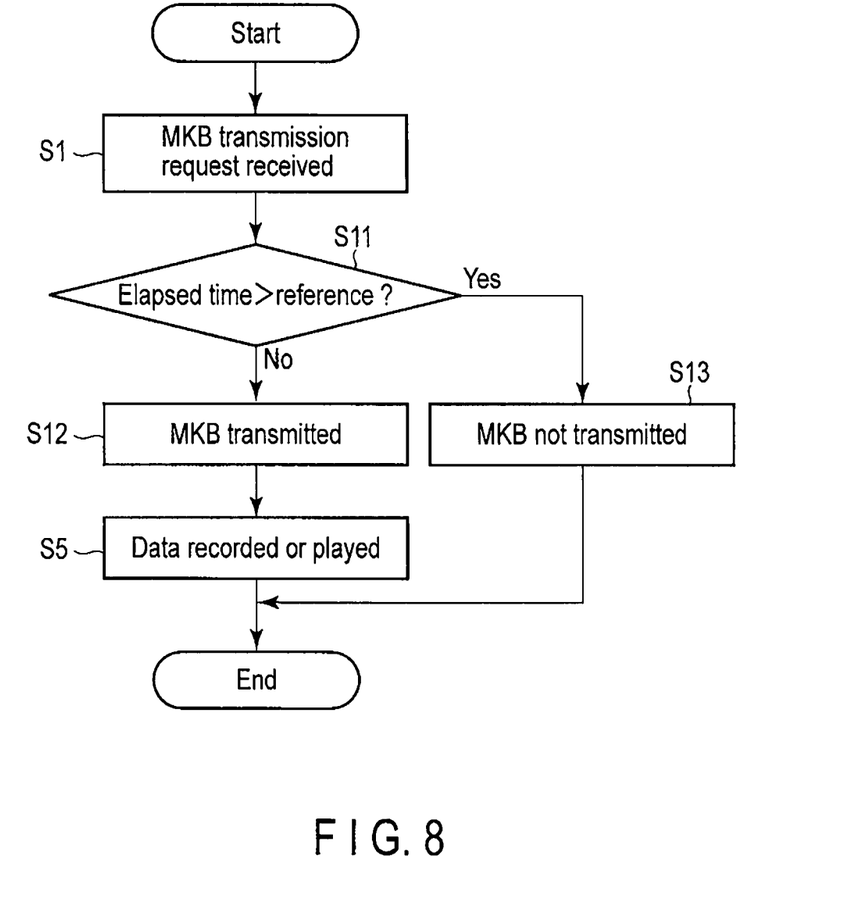
FIG. 8 illustrates a flowchart for recording and playing data according to the second embodiment.

Referring to FIG. 8, recording and playing data in the memory card 2 will now be described. FIG. 8 illustrates a flowchart for recording and playing data according to the second embodiment. As shown in FIG. 8, the memory controller 72 receives a request to transmit the MKB from the host 1 (step S1). The request may occur when the host 1 records or plays the data in the memory card 1 according to the copyright protection procedure. Upon reception of the MKB transmission request, the memory controller 72 requests the period comparator 81 to check the time limit for the MKB. Upon reception of the request, the period comparator 81 in turn checks whether the elapsed time from the last time when the MKB in the memory card 2 was recorded (including update) exceeds the reference (step S11). The reference is non-volatilely stored in the memory card 2, for example, in the period comparator 81 or the memory 41). If the reference is not reached, this represents that the MKB in the memory card 2 has not expired yet. As a result, transmission of the MKB by the memory control section 72 is permitted, and the memory control section 72 transmits it to the host 1 (step S12). The report indicative of the time limit not reached may be executed by the period comparator 81 and/or the interface controller 82 reporting to the memory control section 72. Data recording or playing then occurs using the device key and MKB according to the copyright protection procedure (step S5).

In contrast, if the elapsed time exceeds the threshold in step S11, this means that the MKB in the memory card 2 has expired. Then, the period comparator 81 reports such a result to the interface controller 82. In response to this, the interface controller 82 prohibits the memory control section 72 from transmitting the MKB (step S13). Specifically, the memory control section 72 does not transmit the MKB, or transmits a response indicative of refusing the transmission, for example. Thus, recording or playing data is completed. Alternatively, if the memory card 2 is online connected to the MKB management server 51, the MKB in the memory card 2 may be updated according to the first embodiment after step S13. Furthermore, steps S2 to S4 may occur after the memory card 2 is online connected to the MKB management server 51 or periodically after that not only after step S13 as in the first embodiment. The check at step S11 may occur in advance of the MKB transmission request from the host 1. Particularly, the period comparators 81 checks whether the elapsed time from the last time when the MKB in the memory card 2 was recorded exceeds the reference after the power supply to the memory card 2 starts and/or periodically after that, and then it only stores the result in the memory or a register. The period comparator 81 then executes step S11 by referring to the stored result.

If the memory card 2 is online connected to the MKB management server 51, the MKB in the memory card 2 is autonomously updated to the latest one according to the first embodiment. In contrast, if the memory card 2 remains online disconnected from the MKB management server 51 for a long time, the MKB may not be updated and may expire. This prohibits the memory card 2 from being used to record or play data according to the copyright protection procedure, and therefore the user is urged to online-connect the memory card 2 to the MKB management server 51 periodically. Thus, the MKB is guaranteed to be the latest one. Note that if the memory card 2 is used while always online connected to the MKB management server 51, the user can always use the memory card 2 according to the copyright protection procedure without paying attention to the time limit of the MKB because the MKB is maintained to be the latest one according to the first embodiment.

If the MKB in the memory card 2 is the latest one upon autonomous update of the MKB according to the first embodiment, it is not updated. This may maintain the last record time of the MKB in the memory card 2, and its time limit may expire when the memory card 2 is used next time. In order to avoid this, the last record time of the MKB in the memory card 2 may be updated in the second embodiment even if it is confirmed to be the latest one according to the first embodiment.

As described above, the memory card 2 according to the second embodiment includes the period comparator 81 and the interface controller 82 as well as the configuration of the first embodiment. The period comparator 81 autonomously checks the elapsed time from the last time the MKB in the memory card 2 was recorded. If the elapsed time exceeds the reference, the interface controller 82 prohibits the memory controller 72 from transmitting the MKB. This prohibits use of the MKB which has exceeds the time limit configurable with the reference. As a result, use of an old MKB is less likely, the revocation can be fully used, and robust copyright protection can be realized. The same advantages as the first embodiment can also be obtained.

Third Embodiment

The third embodiment relates to online connection between the memory card 2 and the MKB management server 51. The memory card 2 according to the third embodiment includes the same hardware configuration as the first embodiment (FIG. 1). However, functional blocks realized by the hardware configuration differ between the first and third embodiments. The following description discusses functional blocks different from the first embodiment. In contrast, note that all description of the first embodiment is applied to matters not discussed in the description of the third embodiment.

Figure 9:
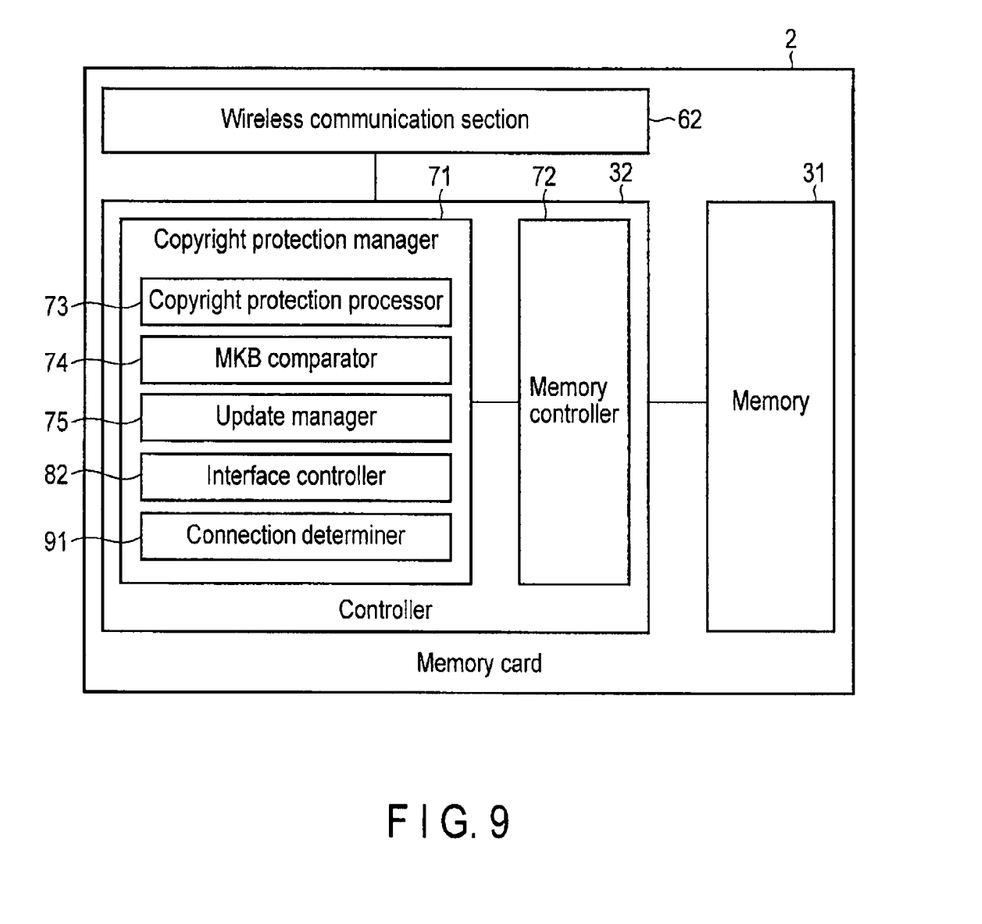
FIG. 9 illustrates functional blocks of the memory device according to a third embodiment.

FIG. 9 illustrates functional block of the memory card 2 according to the third embodiment. These functional blocks are also realized in the controller 32, and are implemented with the control program in the ROM 43 and/or RAM 44 when executed by the MPU 42 as described above. As shown in FIG. 9, the copyright protection manager 71 includes the interface controller 82 and a connection determiner 91 as well as the functional blocks in the first embodiment.

Figure 10:
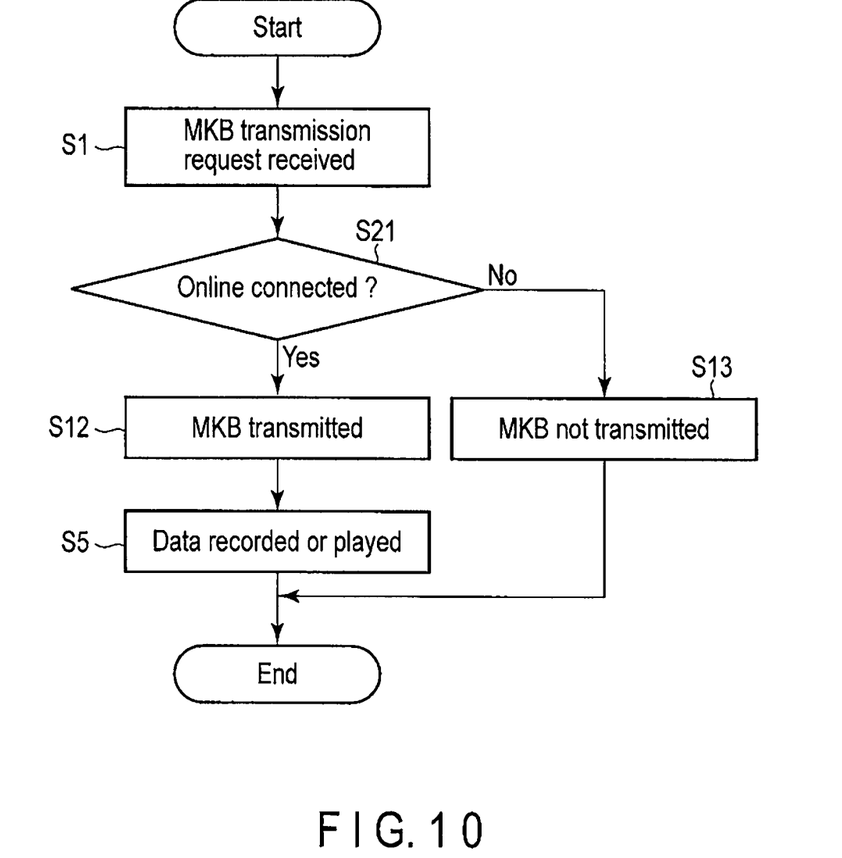
FIG. 10 illustrates a flowchart for recording and playing data according to the third embodiment.

The connection determiner 91 checks whether the memory card 2 (or, radio section 22) is online connected to the MKB management server 51. The connection determiner 91 reports the result of connection/disconnection to the interface controller 82. The report may occur periodically or upon transition of the state. The interface controller 82 permits the memory controller 72 to transmit the MKB to the host 1 only while the memory card 2 is online connected to the server 51. In contrast, the interface controller 82 prohibits the memory control section 72 from transmitting the MKB to the host 1 while not connected. Referring to FIG. 10, recording and playing data in the memory card will now be described. FIG. 10 illustrates a flowchart for recording and playing data according to the third embodiment. As shown in FIG. 10, the memory controller 72 receives the request to transmit the MKB from the host 1 (step S1). The request may occur when the host 1 records or plays the data in the memory card 1 according to the copyright protection procedure. Upon reception of the MKB transmission request, the memory controller 72 requests the connection determiner 91 to determine whether the memory card 2 is online connected to the MKB management server 51. Upon reception of the request, the connection determiner 91 in turn determines whether the memory card 2 is online connected to the MKB management server 51 (step S21). The connection determiner 91 reports the result to the interface controller 82.

If there is online connection, the interface controller 82 permits the memory controller 72 to transmit the MKB and the memory controller 72 transmits it to the host 1 (step S12). Data recording or playing then occurs using the device key and MKB according to the copyright protection procedure (step S5).

In contrast, if there is no online connection in step S21, the interface controller 82 prohibits the memory controller 72 from transmitting the MKB (step S13). Specifically, the memory control section 72 does not transmit the MKB, or transmits a response indicative of refusing the transmission, for example.

The check at step S21 may occur in advance of the MKB transmission request from the host 1. Particularly, the connection determiner 91 determines whether the memory card 2 is online connected after the power supply to the memory card 2 starts and/or periodically after that, and then it only stores the result in the memory or a register. The connection determiner 91 then executes step S21 by referring to the stored result. Alternatively, when the state of the memory card 2 transitions to and from online from and to off-line, the resulting state may be stored.

If the memory card 2 is online connected to the MKB management server 51, the MKB in the memory card 2 is autonomously updated to the latest one according to the first embodiment. In contrast, if the memory card 2 remains online disconnected from the MKB management server 51 for a long time, the memory card 2 does not transmit the MKB to the host 1. This prevents use of an old MKB.

The techniques of the second embodiment may be added to the third embodiment.

As described above the memory card 2 according to the third embodiment includes the connection determiner 91 and the interface controller 82 as well as the configuration of the first embodiment. The connection determiner 91 autonomously determines whether the memory card 2 is online connected to the MKB management server 51. Without online connection, the interface control 82 prohibits the memory controller 72 from transmitting the MKB. This eliminates a possibility for use of an old MKB in the memory card 2. As a result, the revocation can be fully used, and robust copyright protection can be realized. The same advantages as the first embodiment can also be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
 a semiconductor memory;
 a memory controller which controls the semiconductor memory according to a request from outside the device;
 a radio section for wireless communication; and
 a controller which manages storing data in the device according to a procedure for protecting copyright, obtains a latest version of a parameter for protecting copyright which can be updated from outside the device via the radio section, comprises a comparator which compares a parameter stored in the device with the latest version of the parameter, and comprises an update manager which updates the stored parameter to the latest version of the parameter when they are different.

2. The device of claim 1, wherein
 the procedure requires generating a first key from the stored parameter and second keys unique to respective host devices configured to operate according to the procedure,
 the procedure requires the first key for executing the procedure, and
 the stored parameter is configured to prohibit generation of the first key when combined with a particular one of the second keys, and is transmitted to a host device with which the device communicates in response to a request from the host device.

3. The device of claim 2, wherein
 the procedure requires encrypting a content key used to encrypt content data using the first key.

4. The device of claim 3, wherein
 the stored parameter comprises a media key block (MKB) in a content protection for recordable media (CPRM) standard.

5. The device of claim 1, wherein
 the radio section comprises an antenna.

6. The device of claim 1, wherein
 the radio section comprises a terminal for being electrically coupled to an antenna in a host device.

7. The device of claim 1, wherein
 the controller
 comprises a period comparator which compares an elapsed time from a last time when the stored parameter is recorded and a reference,
 refuses a request to transmit the stored parameter to outside the device when the elapsed time exceeds the reference, and
 transmits the stored parameter to outside the device when the elapsed time is below the reference.

8. The device of claim 1, wherein
 the controller comprises a connection determiner which determines whether the radio section is online connected to outside the device, and
 the connection determiner refuses a request to transmit the stored parameter to outside the device when the radio section is online disconnected from outside the device, and transmits the stored parameter to outside the device when the radio section is online connected to outside the device.

9. A memory device comprising:
a semiconductor memory;
a memory controller which controls the semiconductor memory according to a request from outside the device;
a radio section for wireless communication; and
a controller which manages storing data in the device according to a procedure for protecting copyright, comprises a period comparator which compares an elapsed time from a last time when a stored parameter is recorded and a reference, refuses a request to transmit the parameter to outside the device when the elapsed time exceeds the reference, and transmits the parameter to outside the device when the elapsed time is below the reference.

10. The device of claim 9, wherein
the procedure requires generating a first key from the parameter and second keys unique to respective host devices configured to operate according to the procedure,
the procedure requires the first key for executing the procedure, and
the parameter is configured to prohibit generation of the first key when combined with a particular one of the second keys, and is transmitted to a host device with which the device communicates in response to a request from the host device.

11. The device of claim 10, wherein
the procedure requires encrypting a content key used to encrypt content data using the first key.

12. The device of claim 11, wherein
the parameter comprises a media key block (MKB) in a content protection for recordable media (CPRM) standard.

13. The device of claim 10, wherein
the radio section comprises an antenna.

14. The device of claim 10, wherein
the radio section comprises a terminal for being electrically coupled to an antenna in a host device.

15. A memory device comprising:
a semiconductor memory;
a memory controller which controls the semiconductor memory according to a request from outside the device;
a radio section for wireless communication; and
a controller which manages storing data in the device according to a procedure for protecting copyright, and comprises a connection determiner which determines whether the radio section is online connected to a server which manages a parameter for protecting copyright, wherein the connection determiner refuses a request to transmit a stored parameter to outside the device when the radio section is online disconnected from the server, and transmits the stored parameter to outside the device when the radio section is online connected to the server, wherein
the procedure requires generating a first key from the stored parameter and second keys unique to respective host devices configured to operate according to the procedure,
the procedure requires the first key for executing the procedure, and
the stored parameter is configured to prohibit generation of the first key when combined with a particular one of the second keys, and is transmitted to a host device with which the device communicates in response to a request from the host device.

16. The device of claim 15, wherein
the procedure requires encrypting a content key used to encrypt content data using the first key.

17. The device of claim 15, wherein
the stored parameter comprises a media key block (MKB) in a content protection for recordable media (CPRM) standard.

18. The device of claim 15, wherein
the radio section comprises an antenna.

19. The device of claim 15, wherein
the radio section comprises a terminal for being electrically coupled to an antenna in a host device.

* * * * *